United States Patent
Wei

(10) Patent No.: US 6,738,138 B2
(45) Date of Patent: *May 18, 2004

(54) SMALL SPOT ELLIPSOMETER

(75) Inventor: Lanhua Wei, Fremont, CA (US)

(73) Assignee: Therma-Wave, Inc., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/310,195

(22) Filed: Dec. 4, 2002

(65) Prior Publication Data

US 2003/0117626 A1 Jun. 26, 2003

Related U.S. Application Data

(63) Continuation of application No. 09/779,761, filed on Feb. 8, 2001, now Pat. No. 6,515,744.

(51) Int. Cl.$^7$ .................................................. G01J 4/00
(52) U.S. Cl. ...................................................... 356/369
(58) Field of Search ................................ 356/364–369, 356/601–613, 630–632, 388–390, 327, 496, 237.2, 237.6, 502–503, 234.1, 432, 72, 445, 450, 520, 514; 250/372, 225, 201.2, 559.28, 226, 216, 559.07

(56) References Cited

U.S. PATENT DOCUMENTS

| | | | |
|---|---|---|---|
| 5,502,567 A | * 3/1996 | Pokrowsky et al. | ........ 356/367 |
| 5,798,837 A | 8/1998 | Aspnes et al. | ............. 356/369 |
| 5,898,522 A | 4/1999 | Herpst | ........................ 359/509 |
| 5,992,179 A | 11/1999 | Xu et al. | ........................ 65/47 |
| 6,124,934 A | 9/2000 | Shahar et al. | ............... 356/624 |
| 6,134,011 A | 10/2000 | Klein et al. | ................. 250/225 |

FOREIGN PATENT DOCUMENTS

| | | | |
|---|---|---|---|
| WO | WO 99/02970 | 1/1999 | .......... G01N/21/21 |
| WO | WO 00/65331 | 11/2000 | .......... G01N/21/21 |

OTHER PUBLICATIONS

On–line brochure printed from www.mellesgriot.com, "Collimating and Focusing Lenses," Mar. 6, 2002, pp. 15.3–15.5.
On–line brochure printed from www.mellesgriot.com, "Gradient–Index Lenses," Mar. 6, 2002, pp. 15.16–15.20.

* cited by examiner

Primary Examiner—Tu T. Nguyen
(74) Attorney, Agent, or Firm—Stallman & Pollock LLP

(57) ABSTRACT

An ellipsometer capable of generating a small beam spot is disclosed. The ellipsometer includes a light source for generating a narrow bandwidth probe beam. An analyzer is provided for determining the change in polarization state of the probe beam after interaction with the sample. A lens is provided having a numerical aperture and focal length sufficient to focus the beam to a diameter of less than 20 microns on the sample surface. The lens is formed from a graded index glass wherein the index of refraction varies along its optical axis. The lens is held in a relatively stress free mount to reduce stress birefringence created in the lens due to changes in ambient temperature. The ellipsometer is capable of measuring features on semiconductors having a dimensions as small as 50×50 microns.

23 Claims, 4 Drawing Sheets

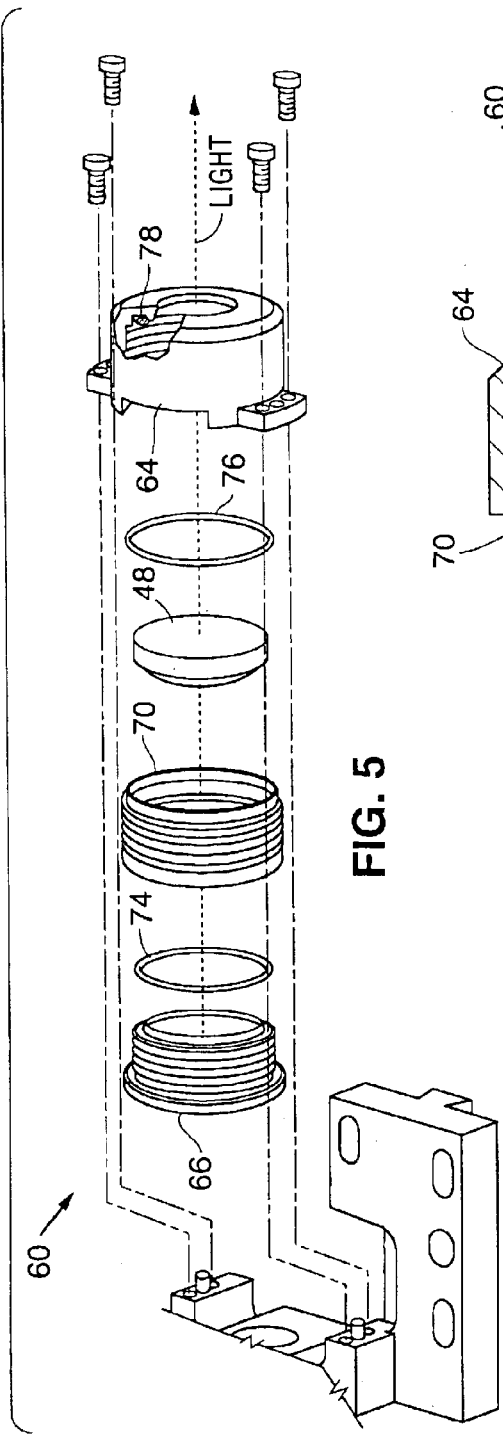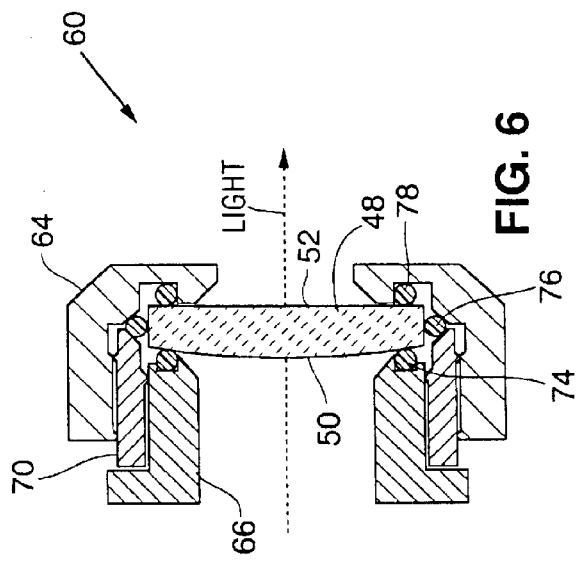

SMALL SPOT ELLIPSOMETER

This application is a continuation application of U.S. patent application 09/779,761, entitled SMALL SPOT ELLIPSOMETER having a filing date of Feb. 8, 2001 now U.S. Pat. No. 6,515,744, and which is hereby incorporated by reference.

TECHNICAL FIELD

The subject invention relates to small spot ellipsometer useful for making measurements on semiconductor wafers. The ellipsometer is preferably of the single wavelength type capable of making highly accurate measurements of very thin films formed on substrates.

BACKGROUND OF THE INVENTION

Ellipsometric techniques for analyzing samples have been used for quite some time. In a basic system, a probe beam having a known polarization state is directed to interact with the sample. An analyzer is provided for determining the change in the polarization state of the beam induced by its interaction with the sample. By analyzing the change in polarization state, characterizations about the sample can be evaluated. At the present time, these systems are commonly used to analyze characteristics such as thickness, refractive index and extinction coefficient of very thin films formed on substrates.

Some prior art ellipsometers utilize lasers to generate a narrow wavelength band of light to define the probe beam. Other ellipsometers utilize polychromatic or white light sources to generate the probe beam. The latter type systems can produce multiple measurements over a broad range of wavelengths. Such multiple measurements can be very useful. One drawback with a broadband system, however, is that since the probe beam is generated from a non-coherent light source, the size of the region on the sample which can be imaged is typically larger than can be achieved with a probe beam from a laser. Today, semiconductor manufacturers often want to make measurements in extremely small regions and therefore laser sources having a coherent output are used to obtain a smaller focused probe beam spot. In addition, gas discharge lasers are often used since they produce a very stable wavelength output which enhances the repeatability of the measurements.

The subject invention is directed to an ellipsometer which utilizes a laser for generating a narrow-band of radiation for use as the probe beam. The assignee herein has developed such a narrow-band ellipsometer for commercial use. Such an ellipsometer is disclosed in U.S. Pat. No. 5,798,837, incorporated herein by reference.

The current commercial embodiment of the assignee's single wavelength ellipsometer includes a helium-neon gas discharge laser generating a probe beam at 633 nm. The beam is focused onto the sample using a fused silica lens having a numerical aperture of 0.035 and a focal length in excess of 100 mm. This arrangement produced an elliptical probe beam spot on the sample having a diameter, on the order of 20×40 microns. (Unless stated differently, the diameter referred to in this specification and claims is the $1/e^2$ diameter.) Given that the intensity distribution of the beam has gaussian characteristics (i.e. is larger than the $1/e^2$ diameter), this beam spot size was suitable for measurements on features (pads) on the wafers of about 100×100 microns.

Recently, semiconductor manufacturers are seeking instruments that can obtain measurements on pads of only 50×50 microns. To achieve this goal, a lens system must be developed with a larger numerical aperture and a shorter focal length in order to reduce the spot size in the longer axis down below 25 microns and preferably less than 20 microns.

An increase in the numerical aperture and a reduction of the focal length of a lens requires increasing the curvature of the lens. As the lens curvature increases, spherical aberrations increase, reducing the ability of the lens to properly focus the light.

There are a few relatively common methods for addressing the problem of spherical aberration. The first is to use a compound lens systems where a second lens is used to correct the spherical aberrations induced by the first lens. This approach can lead to certain problems. More particularly, if more than one lens is used, the spacing between those two lenses must be controlled very accurately as any variation due to temperature or other factors will induce errors in the measurement. In order to achieve the necessary level of stability, relatively rigid mounts are necessary which can create stress birefringence in the lens as discussed below.

Another approach is to use aspheric (non-spherical) focusing surfaces on the lens. Using sophisticated computer modeling, aspheric surfaces can be designed which will correct for any spherical aberrations created by the lens. However, these surfaces can become quite complex. In practice, it is quite difficult to machine these complex surfaces accurately and repeatably. Any inaccuracies in the lens surface can cause unacceptable diffraction problems.

Another approach to obtaining a small spot size on the sample is to place a small aperture in the path of the probe beam. By using an aperture, the requirements for lenses are relaxed. However, this approach is undesirable since it is extremely sensitive to alignment and vibration errors.

Accordingly, it would be desirable to create an ellipsometer that can produced a small spot that does not have the problems associated with the above-described solutions.

SUMMARY OF THE INVENTION

In accordance with the subject invention, an ellipsometer is provided which includes a laser for generating a narrow-band, preferably single wavelength probe beam. The probe beam is directed to reflect off the sample at a non-normal angle of incidence. The polarization state of the reflected probe beam is analyzed to determine any changes thereto induced by the interaction with the sample. As discussed below, various known combinations of polarizers and retarders can be used to control and analyze the polarization state of the probe beam.

In accordance with the subject invention, an improved lens system is provided to obtain the small spot size necessary for measurements on pads having 50×50 micron dimensions. More specifically, the lens system includes a lens having at least one spherical surface. In addition, the lens is formed from a material whose index of refraction varies along the optical axis thereof in a manner to reduce spherical aberrations.

Lenses formed from materials whose index of refraction varies in this manner are commercially available from LightPath and sold under the name Gradium® glass. Various types of Gradium glasses are available, each of which have different variations in the index of refraction. The selection of the lens material is dependent upon the application, including the desired numerical aperture and focal length.

Unfortunately, the lenses available from LightPath have a relatively high coefficient of thermal expansion, on the order of $8\times10^{-6}$/K or roughly ten times greater than fused silica lenses (coefficient on the order of $6\times10^{-7}$/K). Lenses having a high coefficient of thermal expansion can give rise to problems since they are typically held in fixed lens mounts. More specifically, as the ambient temperature varies, the lens expands and contracts against the lens mount. This variation in size varies the stress placed on the lens. Stress in the lens creates birefringence which directly effects the polarization of the beam. Thus, temperature variations result in variations in the birefringence of the lens which can significantly reduce the accuracy of the measurement.

This problem was overcome by using a low stress lens mount. This mount, which was previously developed and sold by the assignee for its single wavelength ellipsometer, includes three resilient O-rings configured to support the front, back and radially outer edge of the lens. It was determined that this low stress lens mount operated successfully to minimize stress birefringence in the Gradium lens material lens allowing this type of material to be used.

In experiments, using a lens with an effective numerical aperture of 0.1 and a focal length of 40 mm, an elliptical spot size having dimensions of only 8×16 microns was achieved.

Further details of the subject invention will be discussed with reference to the appended drawings in which:

BRIEF DESCRIPTION OF THE FIGURES

FIG. 5 is an exploded perspective view of a low stress mirror mount.

FIG. 6 is partial cross-sectional view of a low stress mirror mount.

DETAILED DESCRIPTION OF THE PREFERRED EMBODIMENTS

Basic Ellipsometer Configurations

Figure 1:
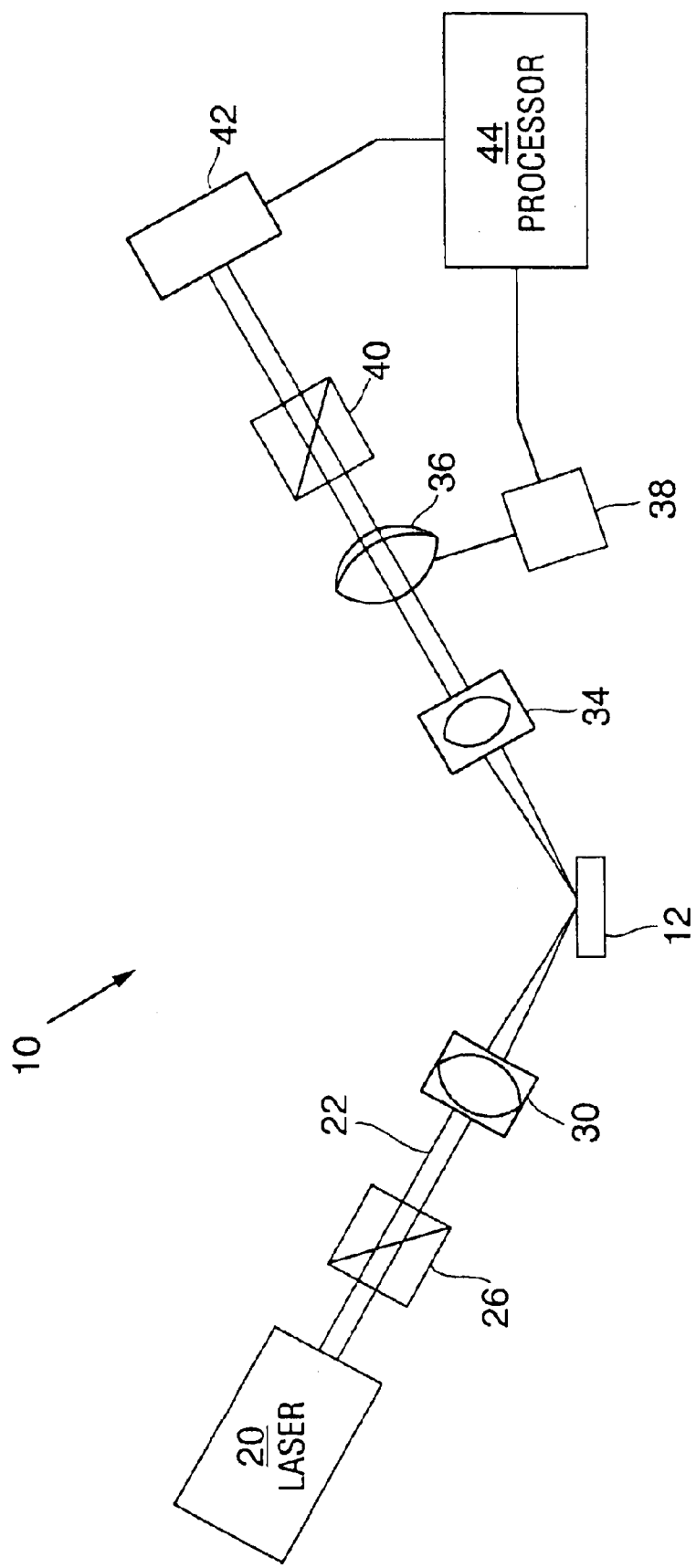
FIG. 1 is a schematic diagram of a single wavelength ellipsometer of the subject invention.

Referring to FIG. 1, there is illustrated an ellipsometer 10 constructed in accordance with the subject invention. The ellipsometer includes a light source 20 for generating a probe beam 22 of light. In the preferred embodiment, light source 20 is a laser generating a wavelength stable probe beam. One example of such a laser is a helium-neon laser generating a probe beam having a wavelength of 633 nm. The helium neon laser generates a very stable output wavelength which does not vary over time (i.e. varies less than 1%). Other gas discharge laser systems could be used. It would also be possible to use diode lasers since they generate a relatively coherent beam of light. At the present time, the wavelength output of diode lasers is less stable and effected by age and temperature and are therefore diode lasers are less desirable.

Beam 22 interacts with polarizer 26 to create a known polarization state. In the preferred embodiment, polarizer 26 is a linear polarizer made from a calcite prism, but in general, the polarization does not necessarily have to be linear, nor even complete. Polarizer 26 can also be made from magnesium fluoride. The azimuth angle of polarizer 26 is oriented so that the plane of the electric vector associated with the linearly polarized beam exiting from the polarizer 26 is at a known angle with respect to the plane of incidence (defined by the propagation direction of the beam 22 and the normal to the surface of sample 12). The azimuth angle is preferably selected to be on the order of 45 degrees because sensitivity is optimized when the reflected intensities of the P and S polarized components are approximately balanced. It should be noted that polarizer 26 can be omitted if the light source 20 emits light with the desired known polarization state.

The beam 22 is focused onto the sample 12 by lens assembly 30 at an oblique angle. Lens assembly 30 is discussed more fully below.

Light from probe beam 22 is reflected by the sample 12 symmetrically to the incident beam about the normal to the sample surface. The beam 22 is ideally incident on sample 12 at an angle on the order of 65 degrees to the normal of the sample surface because sensitivity to sample properties is maximized in the vicinity of the Brewster or pseudo-Brewster angle of a material.

Based upon well known ellipsometric principles, the reflected beam will generally have a mixed linear and circular polarization state after interacting with the sample, as compared to the linear polarization state of the incoming beam. Lens 34 collimates beam 22 after its reflection off of the sample 12.

The beam 22 then passes through a compensator (retarder) 36 which is rotated by electric motor 38. Compensator 36 introduces a relative phase delay $\delta$ (phase retardation) between a pair of mutually orthogonal polarized optical beam components. The amount of phase retardation is a function of the wavelength, the dispersion characteristics of the material used to form the compensator, and the thickness of the compensator.

Compensator 36 is rotated at an angular velocity $\Omega$ (either continuously or in a step-wise fashion) about an axis substantially parallel to the propagation direction of beam 22. Compensator 36 can be any conventional wave-plate compensator, for example those made of crystal quartz. The thickness and material of the compensator 36 are selected such that a desired phase retardation of the beam is induced. In the preferred embodiment, compensator 36 is a zero-order plate formed from mica. Other types of compensators could be used including bi-plate compensators. Bi-plate compensators are constructed of two parallel plates of anisotropic (usually birefringent) material, such as quartz crystals of opposite handedness, where the fast axes of the two plates are perpendicular to each other and the thicknesses are nearly equal, differing only by enough to realize a net first-order retardation for the wavelength produced by the light source 20.

Beam 22 then interacts with polarizer 40, which serves to mix the polarization states incident on it. In this embodiment, polarizer 40 is a linear polarizer, preferably oriented at an azimuth angle of 90 degrees relative to the plane of incidence. However, any optical device that serves to appropriately mix the incoming polarization states can be used as an analyzer. Polarizer 40 is preferably a prism formed from calcite.

It should be noted that the compensator 36 can be located either between the sample 12 and the polarizer 40 or between the sample 12 and the polarizer 26. It should also be noted that polarizers, lenses and compensator are all optimized in their construction for the specific wavelength of light produced by light source 20, which maximizes the accuracy of ellipsometer 10.

Beam 22 then strikes detector 42, which measures the intensity of the beam passing through the compensator/polarizer combination. The processor 44 processes the intensity information measured by the detector 42 to determine the polarization state of the light after interacting with the polarizer 40, and therefore the ellipsometric parameters of the sample. This information processing includes measuring beam intensity as a function of the azimuth (rotational) angle of the compensator about its axis of rotation. This measurement of intensity as a function of compensator rotational angle is effectively a measurement of the intensity of beam 22 as a function of time, since the compensator angular velocity is usually known and a constant.

For the purposes of this specification, the term analyzer is used generally to refer to those optical components necessary to determine the change in polarization state of the beam. These components may vary depending upon the type of ellipsometer configuration selected. The ellipsometer 10 of the present invention is not limited to the specific rotating compensator ellipsometer configuration discussed above. The scope of the present invention includes any ellipsometer configuration in conjunction with the light source 20 that measures the polarization state of the beam after interaction with the sample. For example, another ellipsometric configuration is to rotate either polarizer 26 or 40 with motor 38, instead of rotating the compensator 36.

In addition, null ellipsometry can also be employed. In a null ellipsometer, which can use the same elements as ellipsometer 10, information is derived by aligning the azimuthal angles of these elements until a null or minimum level intensity is measured by the detector 42. In the preferred null ellipsometry embodiment, compensator 36 is aligned so that its fast axis is at an azimuthal angle of 45 degrees relative to the plane of incidence of the sample 12. Polarizers 26 and 40 are rotated about beam 22 such that the light is completely extinguished (minimized) by the analyzer 36.

It is also conceivable to omit compensator 36 from ellipsometer 10, and use motor 38 to rotate either polarizer. The detector signal can be used to accurately measure the linear polarization component of the reflected beam. Then, the circularly polarized component is inferred by assuming that the beam is totally polarized, and what is not linearly polarized must be circularly polarized. Such an ellipsometer, commonly called a rotating-polarizer or rotating-analyzer ellipsometer, is termed "an incomplete" polarimeter, because it is insensitive to the handedness of the circularly polarized component and exhibits poor performance when the light being analyzed is either nearly completely linearly polarized or possesses a depolarized component.

In still another variant, a second compensator can be added, where the first compensator is located between the sample and the polarizer 40, and the second compensator located between the sample and the light source 20. These compensators could be static or rotating. An example of a single wavelength ellipsometer with a pair of rotating compensators is described in U.S. Pat. No. 5,798,837, cited above. Another example is disclosed in WO 00/65331 also incorporated herein by reference.

In any of these embodiments, to provide a static or varying retardation between the polarization states, the compensator can be replaced by a non-rotating opto-electronic element or photo-elastic element, such as a piezo-electric cell retarder which are commonly used in the art to induce a sinusoidal or static phase retardation by applying a varying or static voltage to the cell.

Lens Assembly

The ellipsometer 10 of the subject invention can be configured to focus the probe beam 22 to a smaller spot size than was previously attainable. As noted above, in the assignee's commercial version of the single wavelength ellipsometer, a spot size having dimensions on the order of 20×40 microns could be achieved. In order to reduce that spot size in the longer dimension to below 25 microns and preferably below 20 microns, a lens with a larger numerical aperture and a shorter focal length was necessary. Further, in order to reduce spherical aberrations, a lens was selected which was formed from a material wherein the index of refraction varies along the optical axis thereof.

As noted above, one such type of lens is manufactured by LightPath Technologies of New Mexico under the trademark Gradium® lenses. According to the manufacturer, a number of different glasses with varying indices of refraction are layered together. The glasses are melted to blend the materials continuously across the optical path. It is believed that this process is described in U.S. Pat. No. 5,992,179. Further information about these type of lenses can be obtained from the manufacturer's website at www.light.net (See "Products" and "Gradium lenses").

While these materials have characteristics which permit a lens to be designed with a higher numerical aperture, a shorter focal length and with a minimum of spherical aberrations, they were not considered as particularly suitable for use in highly sensitive ellipsometric applications. More specifically, one of the important criteria for any ellipsometric lens system is that it should not induce polarization changes that vary with changes in ambient conditions. Such variations can occur when a lens expands or contracts with respect to the fixed lens mounting structure. Such size variation create stresses in the lens. Stresses in the lens create birefringent effects which alter the polarization of the beam in a manner which can degrade measurement.

In the past, it was common to use fused silica for these lenses. One key attribute of fused silica is that its coefficient of thermal expansion is quite low, on the order of $6 \times 10^{-7}$/K Even so, to reduce stress birefringence as much as possible, the assignee herein developed a relatively stress free lens mounting system. While this stress free mounting system reduced stress in a fused silica lens to an acceptable level, it was not believed that such a mounting system could provide similar insensitivity for a material with a coefficient of thermal expansion so much larger than fused silica. However, after testing, it appears that the subject mount, described below, is suitable for use even with these Gradium glasses.

Figure 2:
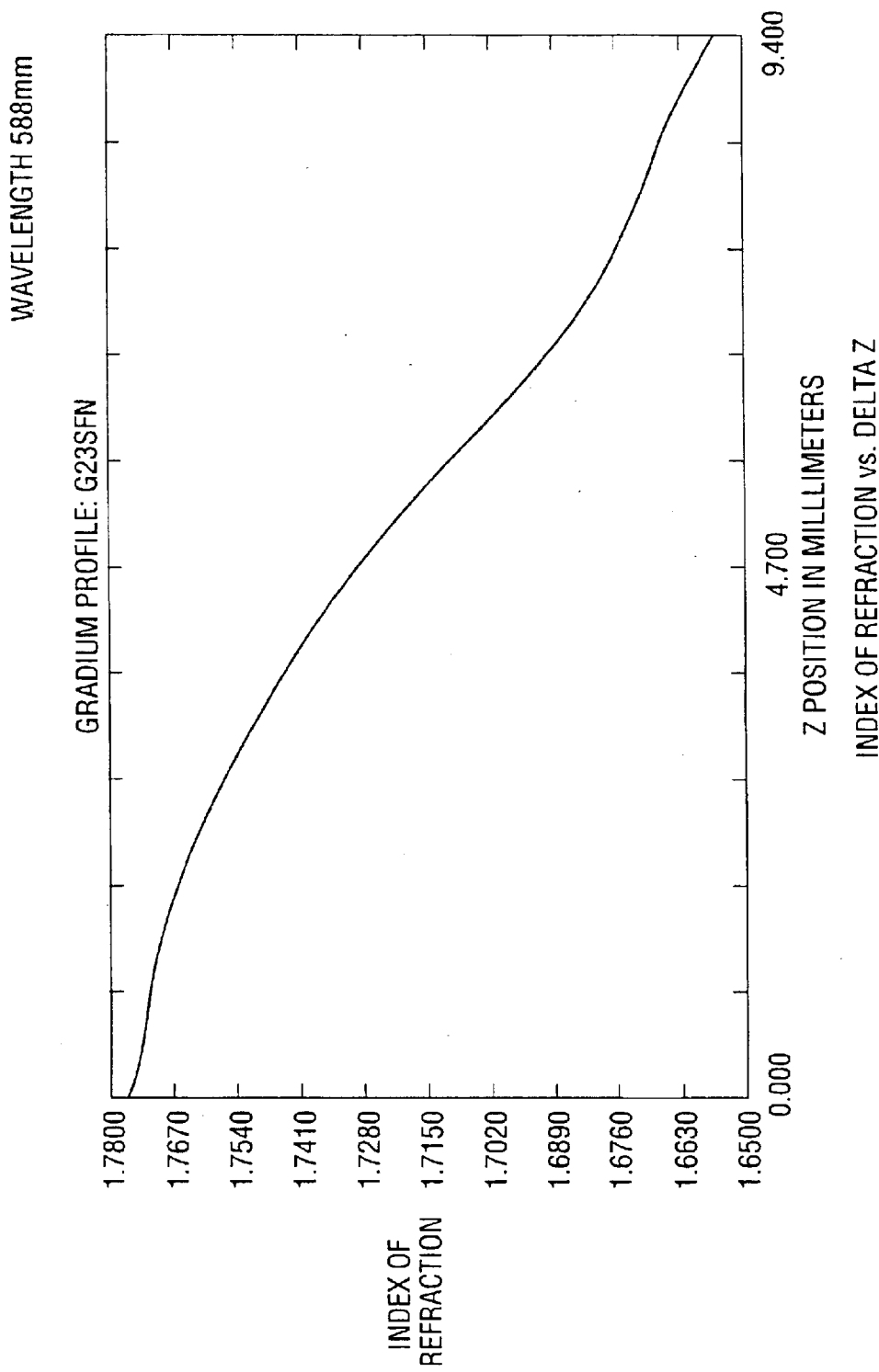
FIG. 2 is a graph illustrating the variation in index of refraction along an optical axis of an exemplary lens material.

In one experimental arrangement, lens 48 was formed from G23SFN material from LightPath. FIG. 2 illustrates the index of refraction profile of this material. The lens (FIG. 6) was cut from a blank and had a spherical front surface (light input side) 50 with a curvature of about 32 mm. The rear surface (light output side) 52 had a slight spherical curvature of about 254 mm. The lens 48 was 4.6 mm thick at its center. The glass material at the rear surface 52 had an index of refraction of about 1.73 and the glass material at the high point of the front surface 50 had an index of refraction of about 1.78. This lens has a focal length of 40 mm and a numerical aperture of 0.29. However, since the diameter of the probe beam is small, i.e. about 8 mm, the effective numerical aperture of the lens for this arrangement was 0.1.

In experiments, this lens was capable of creating a spot size having a $1/e^2$ diameters of 8×16 microns compared to the 20×40 microns for the prior lens. The spot diameter (in the longer axis) in which 99% of the beam energy fell was 26 microns compared with 64 microns in the prior art. Such a spot size can be used to accurately measure within a 50×50 micron pad size.

Although not required, the lens in lens assembly 34 can also be formed from the Gradium glass material.

Figure 3:
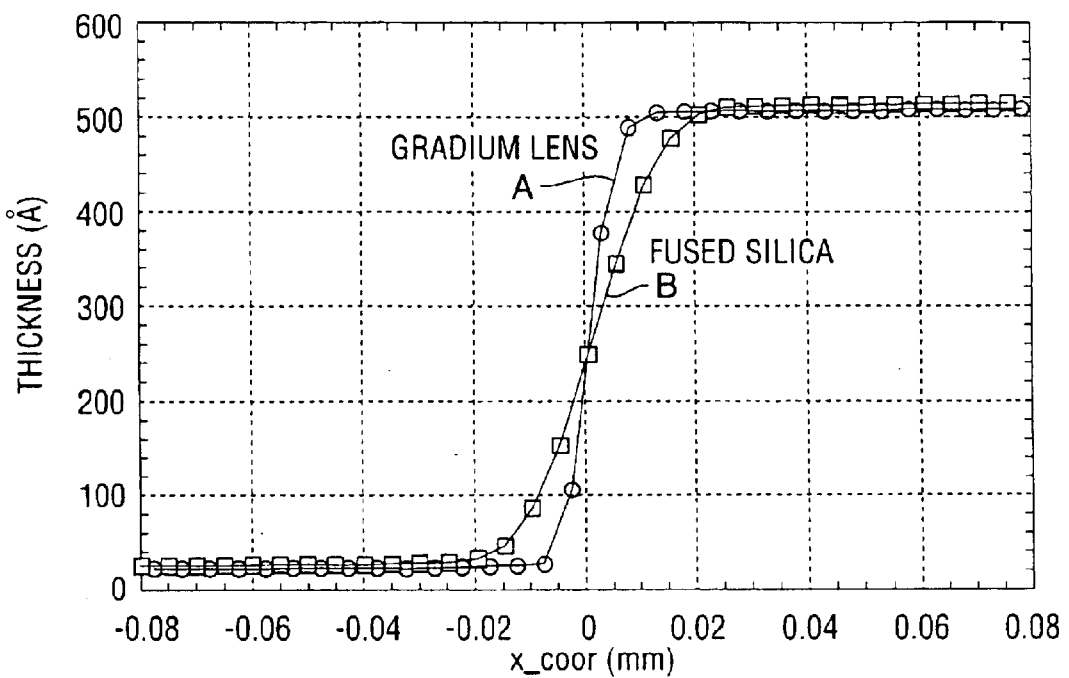
FIG. 3 is a graph comparing the measurements taken when the beam spot of the subject ellipsometer and the beam spot of a prior art ellipsometer were scanned across a boundary.

FIG. 3 is a graph of measurements taken when the beam spot was scanned across a boundary between an oxide having a 20 Å thickness to an oxide having a 500 Å thickness. Curve B illustrates data taken with the conventional fused silica lens having an NA of 0.35. Curve A illustrate data taken with the Gradium lens described herein. As can be seen, the transition between the boundary is much sharper using the lens of the subject invention.

Figure 4:
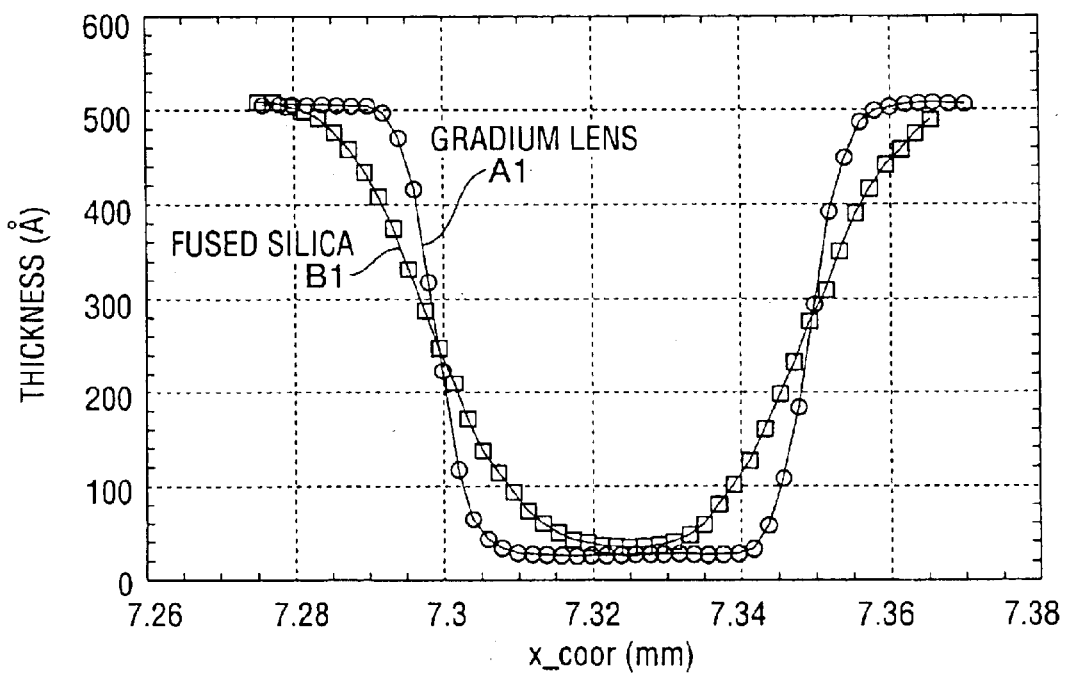
FIG. 4 is a graph comparing the measurements taken when the beam spot of the subject ellipsometer and the beam spot of a prior art ellipsometer were scanned across an thin oxide well.

FIG. 4 is a graph of measurements taken when the beam spot was scanned across a 50 micron wide thin oxide well. Once again, it can be seen from curve A1 that the edges of the well are more crisply defined with the Gradium lens than when a conventional fused silica lens (curve B1) was used.

FIGS. 5 and 6 illustrate the mirror mount 60 that was used with the subject Gradium index lens. An important aspect of this mirror mount is to provide a plurality of resilient O-rings to support the lens.

The mount 60 includes a front support 66 and a rear support 64. Lens 48 is mounted between the front and rear supports. The mount further includes an intermediate support 70 which helps support the radially outer edge of lens 48. Rear and intermediate supports are threaded to allow for assembly.

A first O-ring 74 is provided between the front support 66 and the front of the lens. A second O-ring 76 is provided between the intermediate support 70 and the radially outer edge of the lens. While the lens mount may be implemented with only these two O-rings, it is preferable to have three O-rings. In the preferred embodiment, an additional O-ring 78 is located between the rear support 64 and the rear of the lens.

Each of the O-rings is preferably formed from Viton and have an elasticity (Young's modulus) of $2.5 \times 10^6$ N/m$^2$. The thermal coefficient of expansion of this material is $160 \times 10^{-6}$/K.

In summary, there has been provided an improved small spot ellipsometer for evaluating a sample. The ellipsometer includes a light source for generating a narrow bandwidth probe beam. An analyzer is provided for determining the change in polarization state of the beam after interaction with the sample. A lens is provided having a numerical aperture and focal length sufficient to focus the beam to a diameter of less than 20 microns on the sample surface. The lens is formed from a graded index glass wherein the index of refraction varies along its optical axis. The lens is held in a relatively stress free mount to reduce stress birefringence created in the lens due to changes in ambient temperature. The ellipsometer is capable of measuring features on semiconductors having a dimensions as small as 50×50 microns.

I claim:

1. A small spot ellipsometer for evaluating a sample comprising:
   a light source for generating a probe beam which is to be directed to the surface of the sample;
   an analyzer for evaluating the change in polarization state induced in the beam from interacting with the sample; and
   a lens for focusing the beam to a spot size having a diameter along both axes of less than 25 microns, said lens having a curved focusing surface and being formed from a material whose index of refraction varies along the optical axis in order to substantially reduce spherical aberration.

2. An ellipsometer as recited in claim 1, wherein the focal length of the lens is less than 50 mm.

3. An ellipsometer as recited in claim 2 wherein the numerical aperture of the lens is less than 0.20.

4. An ellipsometer is recited in claim 2 wherein the numerical aperture of the lens is less than 0.15.

5. An ellipsometer as recited in claim 2 wherein the effective numerical aperture of the lens is about 0.1.

6. A ellipsometer as recited in claim 1 wherein said material has a coefficient of thermal expansion in excess of $1 \times 10^{-7}$/K.

7. An ellipsometer as recited in claim 1, further including a lens mount including a plurality of flexible O-rings for supporting the lens in a manner to reduce stress birefringence in the lens induced by changes in the ambient temperature.

8. An ellipsometer as recited in claim 1, wherein said probe beam is defined by a stable, narrow-bandwidth beam.

9. An ellipsometer as recited in claim 8 wherein said light source is a gas-discharge laser.

10. An ellipsometer as recited in claim 1 wherein the focused spot on the sample has a diameter along both axes of less than 20 microns.

11. A small spot ellipsometer for evaluating a sample comprising:
    a light source for generating a probe beam which is to be directed to the surface of the sample;
    an analyzer for evaluating the change in polarization state induced in the beam from interaction with the sample;
    a lens for focusing the beam to a spot on the sample surface, said lens having a curved focusing surface and being formed from a material whose index of refraction varies along the optical axis in order to substantially reduce spherical aberration; and
    a low stress lens mount including a resilient member for supporting the lens in a manner to reduce stress birefringence in the lens induced by changes in the ambient temperature.

12. An ellipsometer as recited in claim 11, wherein a focal length of the lens is less than 50 mm.

13. An ellipsometer as recited in claim 12, wherein a numerical aperture of the lens is less than 0.20.

14. An ellipsometer as recited in claim 12, wherein a numerical aperture of the lens is less then 0.15.

15. An ellipsometer as recited in claim 12, wherein an effective numerical aperture of the lens is about 0.1.

16. An ellipsometer as recited in claim 11, wherein said probe beam is defined by a stable, narrow-bandwidth beam.

17. An ellipsometer as recited in claim 16, wherein said light source is a gas-discharge laser.

18. An ellipsometer as recited in claim 11, wherein the focused spot on the sample has a diameter along both axes if less 20 microns.

19. An ellipsometer as recited in claim 11, wherein the focused spot on the sample has a diameter along one axis of less than 20 microns.

20. An ellipsometer as recited in claim 19 wherein the focused spot diameter on the sample has a diameter along one axis of less than 10, microns.

21. A small spot ellipsometer for evaluating a sample comprising:
    a gas discharge laser having a stable, narrow-bandwidth output defining a probe beam directed to reflect off the surface of the sample;

an analyzer for evaluating the change in polarization state induced in the beam when the beam reflects off the sample;

a lens for focusing the beam to a spot size having a diameter along both axes of less than 20 microns, said lens having a spherical focusing surface, a focal length of less than 50 mm and a numerical aperture less then 0.15 and being formed from a mixture of glass materials arranged so that the index of refraction of the lens varies along the optical axis thereof in order to substantially reduce spherical aberration; and a low stress lens mount including a resilient member for supporting the lens in a manner to reduce stress birefringence in the lens induced by changes in the ambient temperature.

22. An ellipsometer as recited in claim 21, wherein the effective numerical aperture of the lens is about 0.1.

23. An ellopsometer as recited in claim 21, wherein the focused spot diameter on the sample has a diameter along one axis of less than 10 microns.

* * * * *